US006118761A

United States Patent [19]

Kalkunte et al.

[11] Patent Number: 6,118,761
[45] Date of Patent: Sep. 12, 2000

[54] APPARATUS AND METHOD FOR GENERATING RATE CONTROL FRAMES IN A WORKGROUP SWITCH BASED ON TRAFFIC CONTRIBUTION FROM A NETWORK SWITCH PORT

[75] Inventors: Mohan V. Kalkunte, Sunnyvale; Jayant Kadambi, Milpitas, both of Calif.

[73] Assignee: Advanced Micro Devices, Inc., Sunnyvale, Calif.

[21] Appl. No.: 08/992,841

[22] Filed: Dec. 18, 1997

[51] Int. Cl.$^7$ .............................. H04L 12/26; G01R 31/08
[52] U.S. Cl. ........................... 370/229; 370/235; 370/412
[58] Field of Search .................................. 370/229, 230, 370/232–235, 412, 413, 428, 429

[56] References Cited

U.S. PATENT DOCUMENTS

| | | | |
|---|---|---|---|
| 4,771,391 | 9/1988 | Blasbaig ................................. | 709/232 |
| 4,926,415 | 5/1990 | Tawara et al. .......................... | 370/231 |
| 5,319,641 | 6/1994 | Fridrich et al. ........................ | 370/447 |
| 5,353,287 | 10/1994 | Kuddes et al. ......................... | 370/448 |
| 5,367,523 | 11/1994 | Chang et al. .......................... | 370/235 |
| 5,404,353 | 4/1995 | Ben-Michael et al. ................. | 370/235 |
| 5,418,784 | 5/1995 | Ramakrishnan et al. ............... | 370/445 |
| 5,422,887 | 6/1995 | Diepstraten et al. ................... | 370/448 |
| 5,434,860 | 7/1995 | Riddle .................................... | 370/232 |
| 5,436,903 | 7/1995 | Yang et al. ............................. | 370/448 |
| 5,526,355 | 6/1996 | Yang et al. ............................. | 370/448 |
| 5,602,829 | 2/1997 | Nie et al. ................................ | 370/235 |
| 5,768,258 | 6/1998 | Van As et al. .......................... | 370/236 |
| 6,031,821 | 2/2000 | Kalkunte et al. ....................... | 370/235 |
| 6,052,376 | 4/2000 | Wills ...................................... | 370/235 |

FOREIGN PATENT DOCUMENTS 0632621  4/1995  European Pat. Off. ........ H04L 12/40

OTHER PUBLICATIONS

Comer, D.E., et al., "A Rate–Based Congested Avoidance and Control Scheme for Packet Switched Networks," Proc. of the International Conference on Distributed Computing Systems, Paris, May 28–Jun. 1, 1990, Conf. 10, May 28 2990, IEEE, pp. 390–397.

Williamson, C.L., et al., "Loss–Load Curves: Support for Rate–Based Congestion Control in High–Speed Datagram Networks," Proc. of the Conference on Communications Architectures and Protocols (SIGCOMM), Zurich, Sep. 3–6, 1996, vol. 21, No. 4, Sep. 3, 1991, Assn. for Computing Machinery, pp. 17–28.

Pouzin, Louis, "Methods, Tools and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, Jan. 2, 1988, New York, pp. 72–76.

(List continued on next page.)

*Primary Examiner*—Chi H. Pham
*Assistant Examiner*—Maikhanh Tran

[57] ABSTRACT

A network switch in a full-duplex IEEE 802.3 network includes a data monitor module that monitors data utilization between ports. Upon detection of a congestion condition in an output buffer, the data monitor module determines for each of the remaining network switch ports a traffic contribution relative to the total network traffic received by the one congested network switch port. The network switch includes a rate controller that generates rate control frames for the remaining network switch ports, where each rate control frame specifies a transmission rate for the transmitting network node based on the corresponding traffic contribution by the network node. The outputting of a rate control frame to a network node based on the corresponding traffic contribution optimizes elimination of the congestion condition by prioritizing the generation of rate control frames for the network node most responsible for creating the congestion condition. In addition, disruption of traffic is minimized in stations having little or no traffic contribution to the congested network switch port.

22 Claims, 4 Drawing Sheets

OTHER PUBLICATIONS

Johnson, "Fast Ethernet: Dawn of a New Network," Prentice–Hall, Inc. (1996), pp. 158–175.

Breyer et al., "Switched and Fast Ethernet: How It Works and How to Use It", Ziff–Davis Press, Emeryville, CA (1995), pp. 60–70.

Internet Messege to : stds–802–3–hssg.ieee.org from Alakd@aol.com, subject "IPG Issues", Aug. 27, 1996.

Internet Message to: Alaka@aol.com, stds–802–3–hssg@ieee.org from mart@CS.UCR.edu, subject "IPG Issues", Aug. 27, 1996.

APPARATUS AND METHOD FOR GENERATING RATE CONTROL FRAMES IN A WORKGROUP SWITCH BASED ON TRAFFIC CONTRIBUTION FROM A NETWORK SWITCH PORT

CROSS-REFERENCE TO RELATED APPLICATIONS

Commonly assigned, copending applications Ser. No. 08/706,317, filed Aug. 30, 1996, entitled "ARRANGEMENT FOR REGULATING PACKET FLOW RATE IN SHARED-MEDIUM, POINT-TO-POINT, AND SWITCHED NETWORKS" (Attorney Docket No. 1033-176), Ser. No. 08/766,565, filed Dec. 13, 1996, entitled "METHOD AND APPARATUS FOR REGULATING DATA FLOW IN NETWORKS", (Attorney Docket No. 1033-177), and Ser. No. 08/908,593, filed Aug. 8, 1997, entitled APPARATUS AND METHOD IN A NETWORK SWITCH FOR DYNAMICALLY ALLOCATING BANDWIDTH ETHERNET WORKGROUP SWITCHES (attorney docket 1033-291).

TECHNICAL FIELD

The present invention relates to network switching and more particularly, to methods and systems controlling network data traffic on full-duplex media and switched networks.

BACKGROUND ART

Switched local area networks use a network switch for supplying data frames between network nodes such as network stations, routers, etc., where each network node is connected to the network switch by a media. The switched local area network architecture uses a media access control (MAC) layer enabling a network interface to access the media. The network switch passes data frames received from a transmitting node to a destination node based on the header information in the received data frame.

A network switch such as a workgroup switch typically includes port buffering at both input and output buffers. Specifically, a non-blocking switch typically includes ports having input buffers and output buffers such as first in first out (FIFO) buffers, that are sized to accommodate the transfer of data between a source and destination port at wire speed. However, congestion of an output buffer may occur if multiple data packets from multiple input buffers are directed to a single output buffer. Hence, an output buffer may be unable to keep up with reception of data packets from multiple input buffers within the switch.

Flow control has been proposed to reduce network congestion, where a transmitting node temporarily suspends transmission of data packets. A proposed flow control arrangement for a full-duplex environment, referred to as IEEE 802.3x[2] specifies generation of a flow control message, for example a PAUSE frame. A transmitting station that receives the PAUSE frame enters a PAUSE state in which no frames are sent on the network for a time interval specified in the PAUSE frame. Flow control may be implemented on a half-duplex medium by "backpressure," where a receiving node forces a collision so that the transmitting station will abort, backoff, and retransmit.

If flow control is implemented in a switch, however, the transmission of data packets from the respective network nodes is effectively halted until the output congestion eases. One problem associated with implementing flow control in full-duplex links is head of line (HOL) blocking, where a transmitting node sending data packets to the workgroup switch may be forced into a PAUSE interval, even though the transmitting node is attempting to send data packets to a destination node via a network switch port other than the congested network switch port. In addition, outputting flow control PAUSE frames to all the network nodes may unnecessarily reduce all network traffic while the congested output buffer is outputting the data frames. Hence, generation of PAUSE control frames may substantially reduce the throughput of the network unnecessarily.

Similar problems are encountered in a half-duplex environment where a switch uses backpressure. If a particular output buffer is deemed congested, then when a packet arrives at the input buffer of the network switch, the destination address of the packet is decoded; if the destination port is the congested port, then a collision is induced during reception of the data packet to cause the end station to abort transmission, back off, and retransmit. The backpressure is used as long as the output buffer is congested, and hence halts all traffic on the shared medium.

SUMMARY OF THE INVENTION

There is a need for an arrangement in a network switch for alleviating congestion in a network switch, without the necessity of sending PAUSE frames that may unnecessarily reduce network throughput.

There is also a need for an arrangement in a network switch for maintaining network traffic at a maximum rate for data packets unrelated to a congested network switch port.

There is also a need for an arrangement in a network switch for dynamically allocating bandwidth at a network switch port based on a detected congestion condition and the corresponding traffic contribution by each network switch port to the congested network switch port.

There is also a need for an arrangement in a network switch for controlling a detected congestion condition in a transmit buffer of one of the network switch ports, where head of line blocking is minimized in network nodes transmitting data packets to network switch ports other than the congested network switch port.

These and other needs are attained by the present invention, where a network switch outputs rate control frames to network nodes to eliminate a congestion condition, where each rate control frame causes the corresponding network node to operate according to a prescribed bandwidth value, assigned by the network switch, and based on the detected congestion condition and the corresponding traffic contribution.

According to one aspect of the present invention, a method in a network switch having network switch ports comprises detecting a congestion condition in a transmit buffer of one of the network switch ports, determining for each remaining network switch port a traffic contribution relative to a total network traffic received by the congested network switch port, and outputting rate control frames from the remaining network switch ports to network nodes, respectively, each rate control frame based on the detected congestion condition and the corresponding traffic contribution and causing the corresponding network node to operate according to a corresponding bandwidth value assigned by the network switch. Outputting of the rate control frame based on the corresponding traffic contribution optimizes elimination of a congestion condition in the transmit buffer by adjusting the transmission rates of each of the network nodes transmitting data to the congested network switch port. If desired, an additional aspect of the present invention further includes the steps of receiving a data packet, having address information, from one of the transmitting network nodes, and selectively sending to the transmitting network node a second rate control frame specifying rate control operations according to either the corresponding assigned bandwidth value or a maximum bandwidth value based on the address information in the received data packet. These additional aspects of the present invention enable a transmitting station to operate at the maximum bandwidth value if the received data packet is sent to an output buffer other than the congested output buffer. Hence, each network switch port can be configured to operate at a maximum data rate for data packets sent to uncongested switch ports, and a lower controlled rate for transmission of data packets to the congested transmit buffer. Hence, congestion in a transmit buffer can be eliminated quickly after detection, without adversely affecting throughput in unrelated network switch ports.

Another aspect of the present invention provides a network switch comprising network switch ports for sending and receiving data packets between respective network nodes, each network switch port comprising an input buffer for receiving a received data packet from a corresponding network node and an output buffer for transmitting a switched data packet to the corresponding network node, a first monitor configured for detecting a congestion condition in the output buffer of one of the network switch ports, a data traffic monitor configured for determining a traffic contribution, relative to a total network traffic received by the congested network switch port, for each of the remaining network switch ports, and a rate controller for assigning bandwidth values based on the determined traffic contributions and the detected congestion condition and generating rate control frames, each rate control frame causing the corresponding network node to operate according to the corresponding assigned bandwidth value. The data traffic monitor is able to determine the flow of data traffic between the input buffers and the output buffers of the network switch, enabling the network switch to identify which input buffer (and corresponding network node) is most responsible for creating a congestion condition in a network switch output buffer. The rate controller can thus assign bandwidth values based on the determined traffic contribution to eliminate the congestion condition without halting network traffic. An additional specific aspect of the invention is the use of switching logic that determines the destination switch port for a data packet received, where the rate controller selectively outputs a second rate control frame to the transmitting node specifying rate control operations according to either the corresponding assigned bandwidth value or the maximum bandwidth value based on the destination port for the received data packet.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
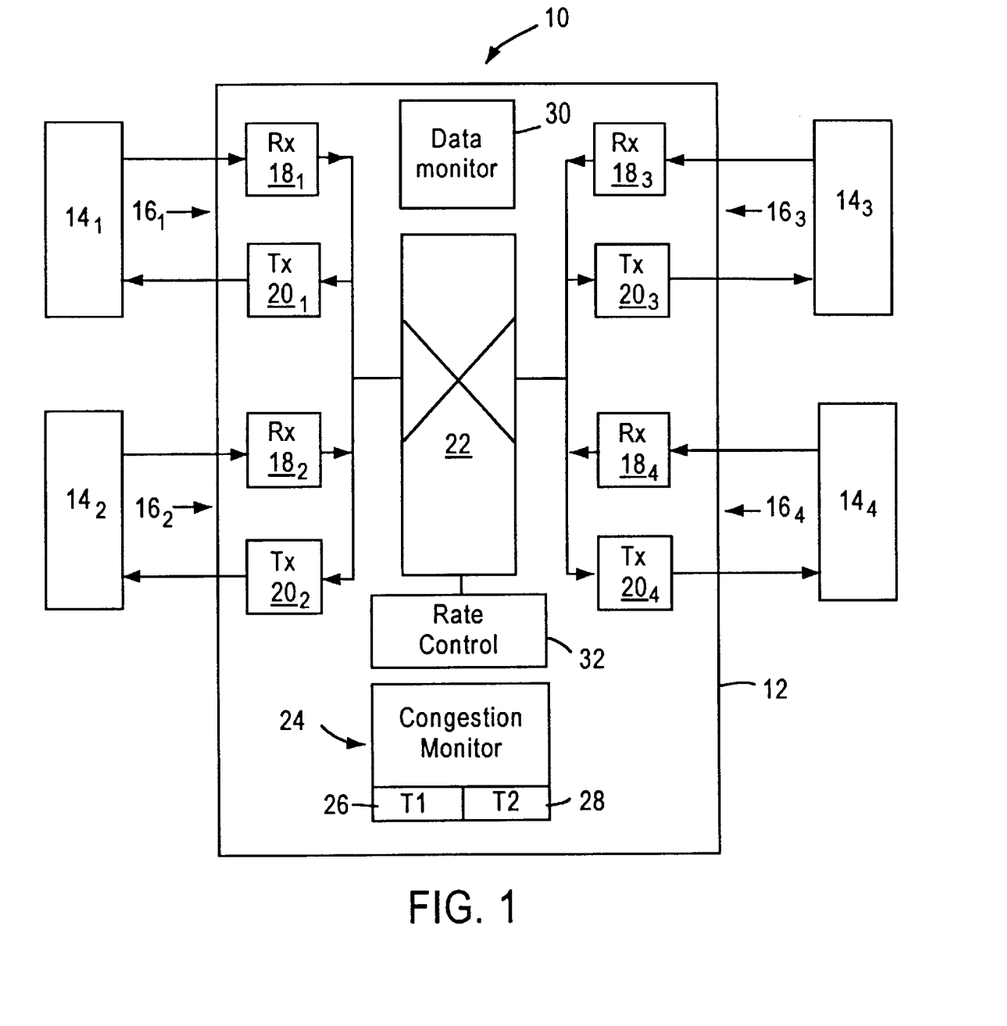
FIG. 1 is a block diagram of the network switch for selectively generating rate control frames according to an embodiment of the present invention.

FIG. 1 is a block diagram of an exemplary system in which the present invention may be advantageously employed. The exemplary system 10 is a packet switched network, such as an Ethernet network. The packet switched network includes a multiple port switch 12 that enables communication of data packets between network nodes 14. According to the disclosed embodiment, the network switch 12 includes network switch ports 16 including an input buffer 18 for receiving a received data packet from a corresponding network node 14. Each network switch port 16 also includes an output buffer 20 for transmitting a switched data packet to the corresponding network node 14. The network switch 12 also includes switching logic 22, also referred to as a switch fabric, for selectively switching a received data packet from an input buffer 18 to a specific output buffer 20 based on address information in the received data frame, and switching logic that makes switching decisions based on the detected address information.

The network switch ports 16 and the network nodes 14 preferably operate in full-duplex mode according to the proposed Ethernet standard IEEE 802.3x Full-Duplex with Flow Control—Working Draft (0.3). The full-duplex environment provides a two-way, point to point communication link between each 100 Mb/s (or 1000 Mb/s) network node 14 and the multiple port switch 12, where the multiple port switch 12 and the respective nodes 14 can simultaneously transmit and receive data packets without collisions. The 100 Mb/s network nodes 14 may be implemented as workstations, servers, or routers for connection to other networks.

The switching logic 22 determines which output buffers 20 should transmit a data packet received by one of the input buffers 18 based on internal switching logic. The switching logic 22 may output a given data packet received by an input buffer 18 to either a single port, multiple ports, or all ports (i.e., broadcast). For example, each data packet includes a header having a source and destination address, where the switching logic 22 may identify the appropriate output buffer 20 based upon the destination address. Alternatively, the destination address may correspond to a virtual address that the switching logic 22 identifies as corresponding to a plurality of network nodes 14. Alternatively, the received data packet may include a virtual LAN (VLAN) tagged frame according to IEEE 801d protocol that specifies another network (via a router at one of the 100 Mb/s nodes 14) or a prescribed group of workstations.

The network switch 12 also includes a congestion monitor 24 configured for detecting a congestion condition in one of the output buffers 20. Specifically, the congestion monitor 24 includes a programmable register 26 for storing a prescribed congestion threshold (T1) as a transmit buffer congestion watermark threshold, and a second register 28 storing a lower watermark threshold (T2) indicating termination of the congestion condition. As described in detail below, a congestion condition is detected in a transmit buffer 20 of one of the network switch ports 16 is the stored number of bytes in the corresponding transmit buffer is detected as exceeding the threshold T1.

According to the disclosed embodiment, rate control frames are applied to the input buffer traffic when a particular port is congested. For example, assume that the network switch 12 is a non-blocking switch, where data packets are switched between ports 16 at wire speed. Assume that a congestion monitor 24 detects a congestion condition in the transmit buffer $20_4$, where the stored number of bytes in the transmit buffer for output buffer $20_4$ exceeds the transmit buffer congestion watermark threshold T1. Upon detecting the congestion condition in the output buffer $20_4$, the network switch 12 outputs rate control frames from the remaining network switch ports (i.e., ports $20_1$, $20_2$, and $20_3$) to the respective network nodes, where each rate control frame causes the corresponding network node to operate according to a prescribed bandwidth value. As described below, the bandwidth value is assigned by the network switch 12 based on the detected congestion condition and the corresponding traffic contribution.

For example, assume input buffers $18_1$, $18_2$, and $18_3$ are sending data packet traffic to the output buffer $20_4$. Let $R_O$ be the output rate at which data is removed from the transmit buffer $20_4$. Assume further that the data rate from input buffer $18_x$ to output buffer $20_y$ is $r_{xy}$. Hence, congestion can occur in the output buffer $20_4$ if the instantaneous rate $r_{14}+r_{24}+r_{34} > R_4$ for time period t, in which $r_{14}$ is the rate of traffic between ports 1 and 4, $r_{24}$ is the rate of traffic between ports 2 and 4, $r_{34}$ is the rate of traffic between ports 3 and 4, and t is the time period, which is defined as:

$$(R_4-(r_{14}+r_{24}+r_{34}))t=T1$$

in which T1 is the Tx FIFO Congestion Watermark Threshold.

Specifically, the network switch 12 includes a data traffic monitor configured for monitoring network traffic throughout the switch 12, including the routing of the received data packet from a given port $18_i$ to at least one output buffer $20_i$. The data monitor 30 monitors the network traffic through the switching logic 22, for example, by receiving management information base (MIB) objects from the switching logic 22 for each data packet routed through the switching logic 22. As such, the data monitor 30 monitors for each output buffer 20 the total network traffic received by the output buffer 20, as well as the relative contribution by each input buffer 18 to the total network traffic received by the one network switch port 20.

Figure 2:
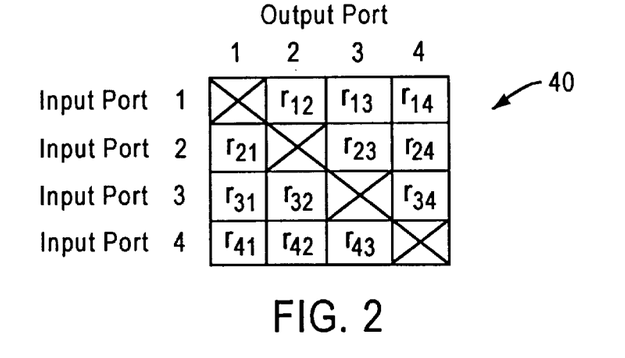
FIG. 2 is a block diagram illustrating the memory in the data traffic monitor for tracking network traffic on a port by port basis.

FIG. 2 is a diagram illustrating a first traffic table 40 in the data monitor 30 for storing packet data traffic information based on data packets switched by the switching logic 22. As shown in FIG. 2, the memory 40 is configured as a traffic table that stores for each output buffer 20 the contributions from the input buffers relative to the corresponding received network traffic. Hence, the output buffer $20_1$ corresponding to column 1 includes the rate of traffic between ports 2 and 1 ($r_{21}$), the rate of traffic between ports 3 and 1 ($r_{31}$), and the rate of traffic between ports 4 and 1 ($r_{41}$). Similarly, column 4 of the traffic table 40 includes the above-described instantaneous rates $r_{14}$, $r_{24}$, and $r_{34}$. Hence, the data monitor 30 identifies, for each destination network switch port 20, the traffic contributions from the respective source ports 18 relative to the total network traffic received by the destination network switch port 20, and stores for each destination port 20 the identified traffic contributions for the source port in terms of the number of bits per second. The data monitor 30 also includes a second normalized traffic table (not shown) for each entry $r_{xy}$, where each value is normalized with respect to the total network traffic received by an output buffer $20_i$. For example, the entry corresponding to $r_{21}$ in traffic table 40 would have a corresponding normalized entry $rn_{21}$, where $rn_{21}=r_{21}/(r_{21}+r_{31}+r_{41})$. As described below, the normalized input data rate rn is used as the identified traffic contribution to determine the assigned bandwidth for the network nodes.

When congestion occurs, the rate control 32 identifies the output rate ($R_O$) of the congested network switch port (having a maximum value of the wire rate), and calculates the assigned bandwidth value (r') for each of the remaining network switch ports by multiplying the corresponding normalized input data rate (rn) with the output rate of the congested network switch port ($R_O$), such that $r'=rn \times R_O$. Hence, when congestion occurs in output buffer $20_4$, the rates of each network node $14_1$, $14_2$, and $14_3$ are limited such that $r'_{14}+r'_{24}+r'_{34}=R_4$.

Figure 3:
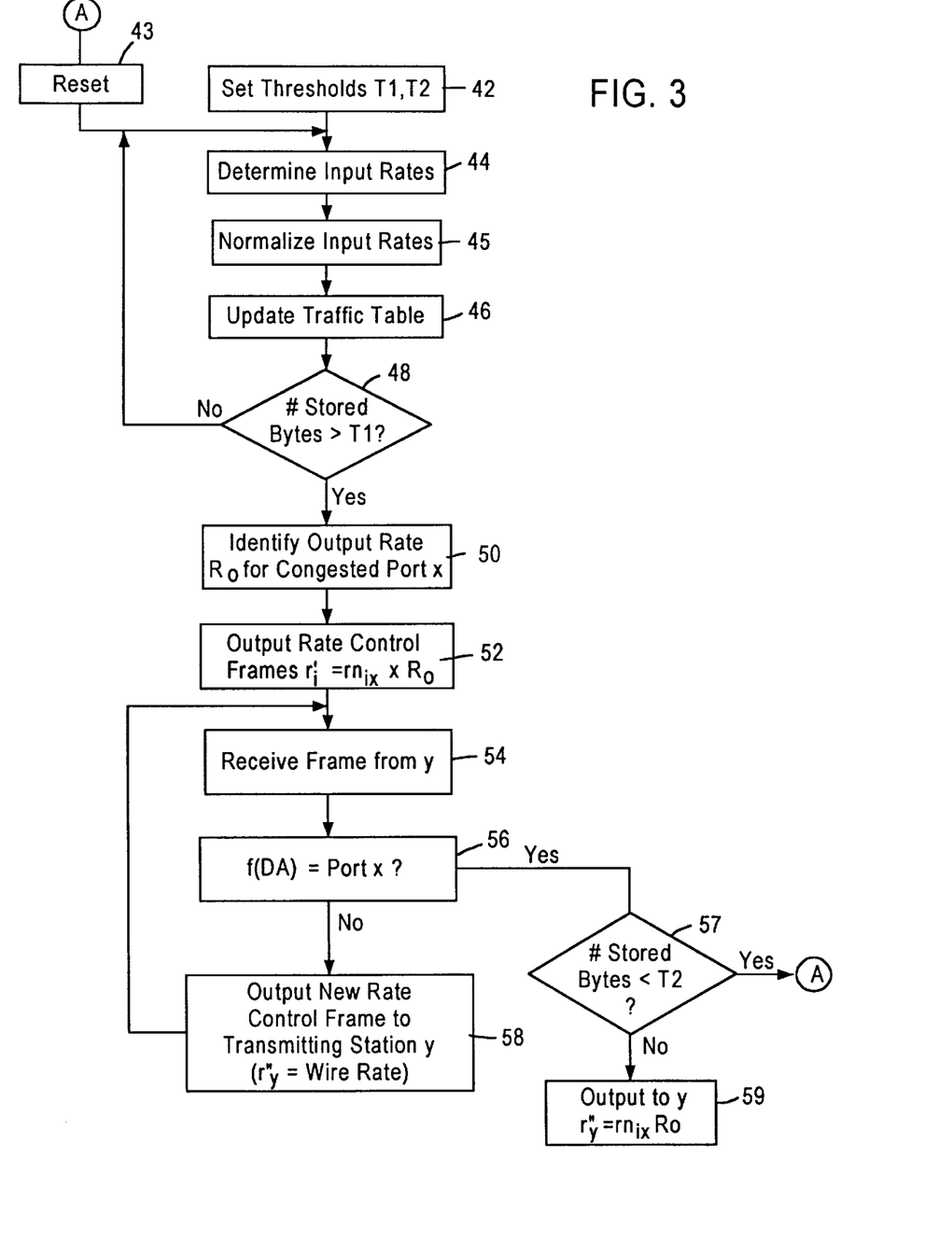
FIG. 3 is a flow diagram illustrating the method for selectively outputting rate control frames to transmitting network nodes to eliminate congestion in a network switch port according to an embodiment of the present invention.

FIG. 3 is a flow diagram illustrating the method for controlling congestion according to an embodiment of the present invention. As shown in FIG. 3, the method begins in step 42 by setting the transmit FIFO congestion watermark threshold T1 and the low watermark threshold T2 in step 42. The data monitor 30 then begins to monitor traffic contributions in step 44 by determining the input data rate ($r_{xy}$) for each input buffer x to a data port y. The data monitor then normalizes the input data rates relative to the total number of input data rates for each output buffer in step 45, and stores the input data rates and the normalized input data rates in the traffic table in step 46. Although the traffic table 40 in FIG. 2 shows only the input data rates $r_{xy}$, the table 40 also will include the normalized rates $rn_{xy}$.

The congestion monitor 24 then monitors the stored number of bytes in each of the transmit buffers $20_i$, and detects if the stored number of bytes in each transmit buffer $20_i$ exceeds the congestion threshold T1 in step 48. The congestion monitor 24 may check each destination output buffer $20_i$ after each switched packet (e.g., on a per-packet basis), or alternatively operate as a state machine that continuously monitors the output buffer $20_i$. If none of the transmit buffers for the output buffer $20_i$ have a stored number of data bytes greater than the threshold T1, then no congestion condition is present. As shown in FIG. 3A, the data monitor 30 continues to monitor the data traffic, and updates the identified traffic contributions, each time a packet is switched (i.e., supplied) to an output buffer, for the respective source ports for each destination port based on the network traffic.

If in step 48 the congestion monitor 24 determines that the stored number of bytes in one of the transmit buffers (e.g., transmit buffer $20_4$) exceeds the prescribed T1 threshold, the rate controller 32 initiates generation of rate control frames to slow the transmission rate of the network nodes 14. Specifically, the rate controller 32 determines the output transmission rate $R_O$ for the congested port x, for example for output buffer 4 in step 50. The rate control 32 then calculates the assigned bandwidth value ($r'_i$) for each of the remaining network switch ports (e.g., ports $16_1$, $16_2$, and $16_3$) by multiplying the corresponding normalized input data rate ($rn_{ix}$) with the output rate ($R_O$) of the congested network switch port $20_4$ in step 52. As described below with respect to FIGS. 4 and 5, the rate control frames output from the remaining network switch ports to the respective network nodes 14 cause the nodes to operate according to the corresponding bandwidth value assigned by the network switch, such that the total rate of data traffic into the congested output buffer $20_x$ equals the output transmission rate ($R_O$). Depending upon the network topology, the output rate of the transmit buffer ($R_O$) may equal the wire rate (e.g., 100 Mb/s), or may equal a lower data rate for half-duplex transmission.

Hence, the rate control 32 outputs rate control frames to the transmitting network nodes in order to reduce the total input data rate to the congested network switch port $20_x$.

An additional feature of the disclosed embodiment ensures that the rate control frames controlling network node operations do not reduce the throughput for data traffic to other network switch ports unrelated to the congested network switch port. As described below, the rate controller 32 selectively sends a second rate control frame specifying rate control operations according to either the corresponding assigned bandwidth value or the maximum bandwidth value (i.e., the wire rate of 100 Mb/s) based on address information in a received data packet. This arrangement ensures that traffic starvation to other non-congested ports is minimized.

As shown in FIG. 3, the method includes receiving a data frame from a transmitting network node $14_y$ in step 54. The switching logic 22 determines a destination port for the received data packet based on address information, for example a destination address (DA) in the received data packet. The switching logic 22 identifies the destination port based on internal switching logic f(DA), and determines in step 56 if the destination port corresponds to the congested network switch port. If in step 56 the rate controller 32 determines from the switching logic 22 that another network switch port 20, other than the congested network switch port $20_4$, is the destination port for the received data packet in step 56, the rate controller 32 outputs a new rate control frame ($r''_y$) to the transmitting station y specifying the new data transmission rate as the wire rate in step 58. According to the disclosed embodiment, the rate control frame may include rate control information in terms of a data rate, or in terms of the interframe spacing between transmitted data packets. If the rate control information specifies the interframe spacing, then the rate controller 32 in step 58 sends a rate control frame specifying use of the minimum interpacket gap.

If in step 56 the rate controller 32 identifies the congested network switch port as the destination port for the data packet, the rate controller checks with the congestion monitor 24 to determine whether the stored number of bytes in the congested network switch port $20_4$ has fallen below the lower threshold T2 in step 57. The low watermark threshold T2, for example 30%–40% of the output buffer, provides hysteresis in the flow control arrangement. If in step 57 the stored number of data bytes has not yet fallen below the threshold T2, the rate controller 32 outputs another rate control frame specifying rate control operations according to the assigned bandwidth value $r''_y = rn_{ix} \times R_O$. Hence, a transmission rate for a network node 14 is toggled between the wire rate (using minimum interpacket gap) and a control rate (using a computed interframe spacing, described below), after decoding the destination address of a received packet. Hence, a new rate control frame can be sent to a transmitting network node 14 upon detecting a new destination address in a received frame. Hence, data traffic to a congested output buffer is controlled, while data traffic to other network switch ports is sent at a maximum wire rate.

Figure 4:
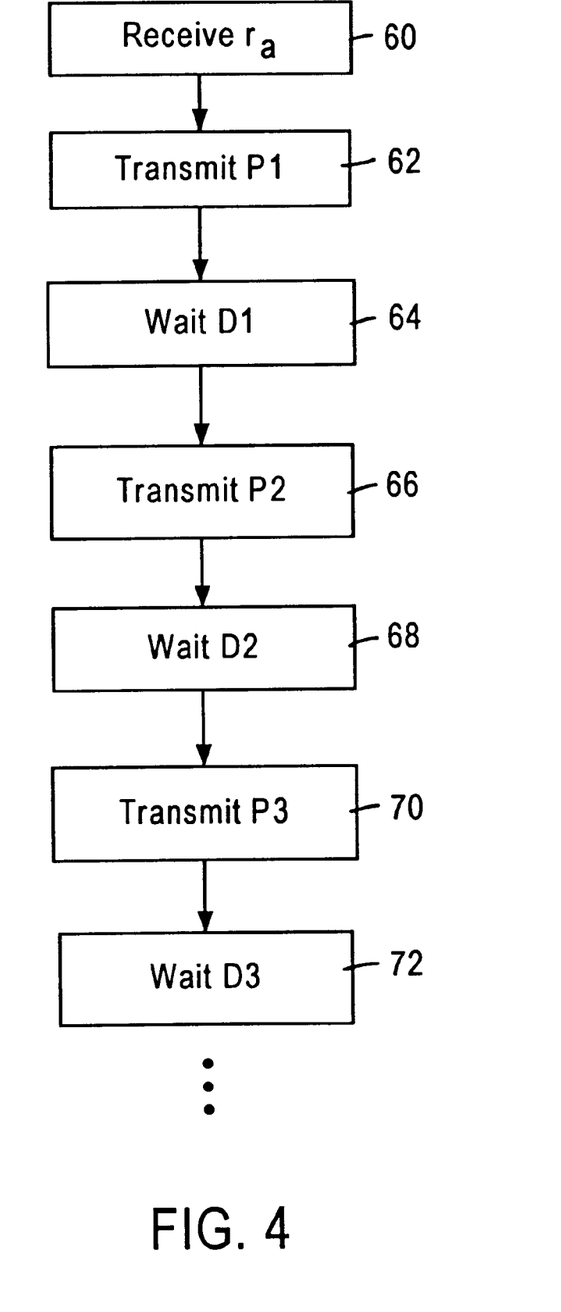
FIG. 4 is a flow diagram summarizing a method in a network station of transmitting data packets based on the rate control packet received from the network switch.
Figure 5:
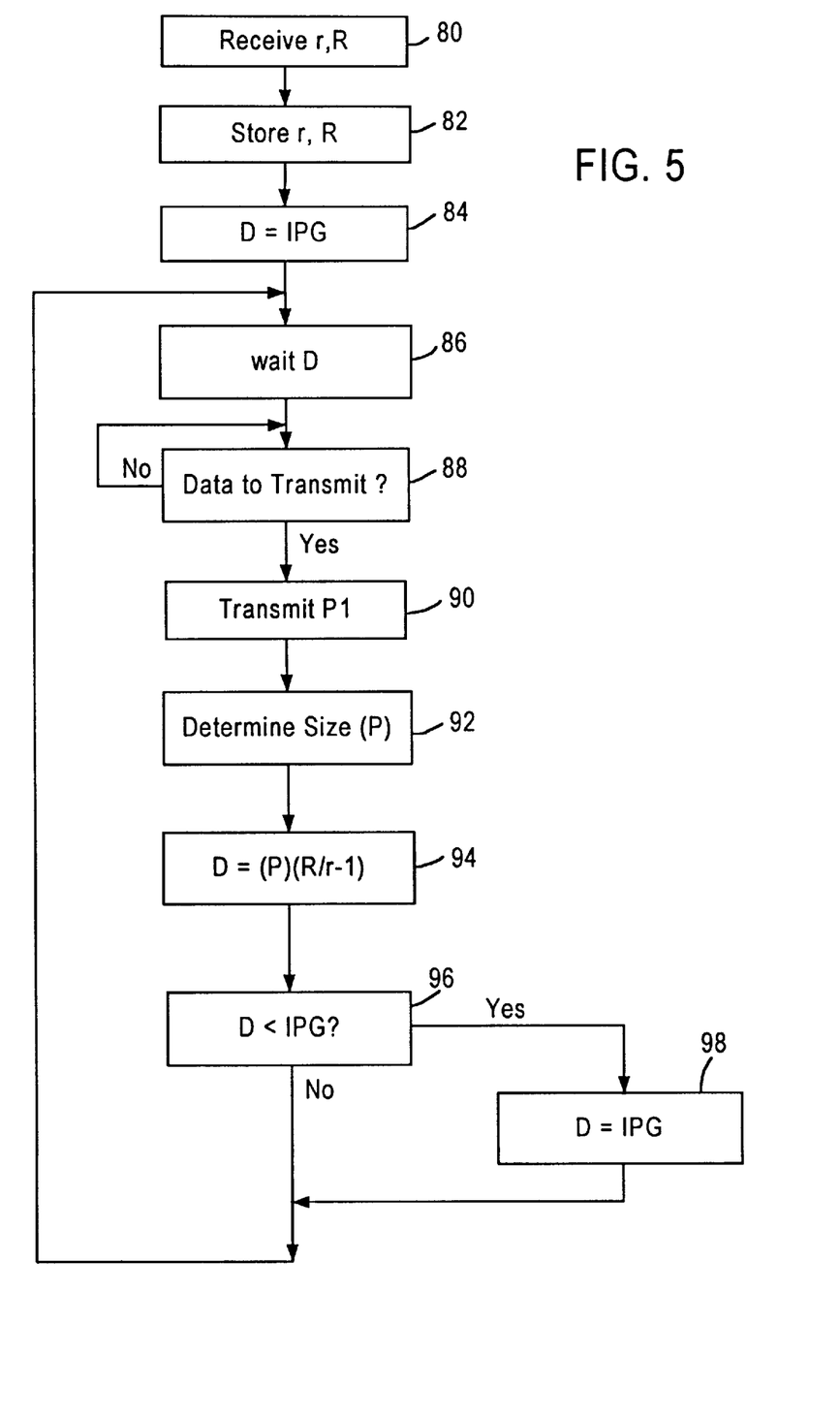
FIG. 5 is a flow diagram illustrating in detail the method of calculating the delay time during rate-controlled transmission by the network station.

FIG. 4 is a flow diagram summarizing the method in a network node 14 for transmitting data in response to reception of a rate control frame. As described above, reception of a rate control frame by the network node 14 causes the network node 14 to operate according to a prescribed bandwidth value assigned by the network switch in order to eliminate congestion conditions in a congested output buffer. The rate control frames of FIGS. 4 and 5 are continued by the network node until reception of another rate control frame specifying another transmission mode. According to the disclosed embodiment, the rate control frame may specify the actual bandwidth value, or alternatively may have a flag bit that is set, causing the network node 14 to initiate rate control according to a previously-received assigned bandwidth value.

As shown in FIG. 4, the method begins in step 60 by the network node receiving the desired transmission rate ($r_a$) from the network switch 12. The network node 14 then transmits a first data packet (P1) in step 62 according to full-duplex Ethernet protocol. The node 14 then calculates a delay time (D1) based upon the desired transmission rate ($r_a$) and the size of the first data packet (P1), described below, and waits in step 64 the determined delay time (D1) before transmitting a second data packet (P2) in step 66. As described below, the duration of the delay time is directly proportional to the size of the transmitted data packet. Hence, if the transmitted data packet (P1) has a large size, i.e., a large number of bytes, the delay time (D1) has a longer duration to maintain an overall constant output transmission rate.

After transmitting the second packet (P2) in step 66, the node 14 will wait for a second delay time (D2) in step 68 based on the size of the second data packet (P2) and the desired transmission rate. After transmission of the third data packet (P3) in step 70, the node 14 will wait a third delay time (D3) in step 72 based upon the size of the third data packet (P3) and the desired transmission rate. Hence, the delay time between transmissions is calculated on a per-packet basis to ensure that the output transmission rate corresponds to the desired transmission rate.

FIG. 5 is a flow diagram illustrating a method of calculating the delay times D1, D2 and D3 of FIG. 4. The disclosed methods may be implemented in the network node 14 by embedding executable code within a memory element within the MAC within the network node 14. The MAC in the network node 14 starts in step 80 by receiving the rate control frame from the network switch 12 a rate control frame identifying the assigned bandwidth value (r). The MAC may also receive in step 80 the predetermined network transmission rate (R), also referred to as the wire rate. After storing the assigned bandwidth value and the wire rate in step 82, the node 14 begins accessing the media by setting the delay time equal to the minimum interpacket gap (IPG) interval of 96 bit time (e.g., 0.96 ms for a 100 Mb/s network). A similar IPG interval may be determined for a 1000 Mb/s network.

After setting the delay time to the minimum IPG in step 84, the network node 14 starts the delay timer in step 86, which causes the network node 14 to wait the set delay time (D).

After waiting the delay interval in step 86, the MAC in the network node 14 checks in step 88 whether there is any data to send. Once the network node 14 has data for transmission, the MAC of the network node 14 transmits the data packet in step 90, and determines the size of the packet (P) in step 92. Information regarding the size of the data packet (P) is obtained from an internal MAC counter that counts the number of transmitted bytes.

After detecting the size of the transmitted data packet (P1) in step 92, the MAC of the transmitting node 14 determines the delay time (D) based upon the size of the transmitted data packet (P), the assigned bandwidth value (r), and the predetermined network transmission rate (R), according to the equation $$D=(p)(R/r-1) \tag{1}$$

The value of the delay time (D) is thus directly proportional to the determined length (p) of the transmitted data packet.

Hence, the predetermined delay time (D) is increased as the size (p) of the transmitted data packet increases in order to maintain an overall output transmission rate corresponding to the desired transmission rate (r). In other words, the network station maintains a constant overall transmission rate (r) by increasing the idle time (D) to compensate for the transmission of a larger data packet (p) at the network rate (R).

After calculating the delay time (D) in step 94, the MAC 22 checks in step 96 if the predetermined delay time (D) equals at least the minimum IPG. If the MAC 22 determines in step 96 that the calculated delay (D) is less than the minimum IPG<the delay time (D) is reset in step 98 to equal the minimum IPG.

According to the disclosed embodiment, a data monitor module within the network switch monitors the data utilization between ports to provide efficient generation of rate control frames without unnecessarily reducing network activity from network nodes that do not provide a substantial contribution to a congestion condition. Rather, rate control frames are output to initially reduce the transmission rate of network nodes, after which additional rate control frames are output to reset a transmission rate of a network node having transmitted a data packet for a network switch port other than the congested network node. Hence, transmission rates can be toggled between a low and a fast rate based on the address information in the received data packet.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network switch having network switch ports, the method comprising:
   detecting a congestion condition in a transmit buffer of one of the network switch ports;
   determining for each remaining network switch port a traffic contribution relative to a total network traffic received by the congested network switch port; and
   outputting rate control frames from the remaining network switch ports to network nodes, respectively, each rate control frame based on the detected congestion condition and the corresponding traffic contribution and causing the corresponding network node to operate according to a corresponding bandwidth value assigned by the network switch.

2. The method of claim 1, wherein the detecting step comprises:
   setting a transmit buffer threshold for the network switch ports; and
   detecting a stored number of bytes in the transmit buffer for the congested network switch port exceeding the transmit buffer threshold.

3. The method of claim 1, wherein the determining step comprises:
   identifying, for each destination network switch port, the traffic contributions from respective source ports relative to the total network traffic received by said each destination network switch port; and
   storing for each destination port the identified traffic contributions for the respective source ports.

4. The method of claim 3, wherein the identifying step comprises:
   determining, for each of the remaining network switch ports, an input data rate to the congested network switch port; and
   calculating a normalized input data rate for each of the input data rates, relative to a total of the input data rates to the congested network switch port, as the corresponding identified traffic contribution.

5. The method of claim 4, wherein the outputting step comprises:
   identifying an output rate of the congested network switch port;
   calculating the assigned bandwidth value for each of the remaining network switch ports by multiplying the corresponding normalized input data rate with the output rate of the congested network switch port.

6. The method of claim 5, further comprising:
   receiving a data packet on one of the network switch ports from a corresponding transmitting network node;
   identifying one of the network switch ports as a destination port for the received data packet; and
   outputting to the transmitting network node a second rate control frame specifying a default bandwidth value, greater than the assigned bandwidth value, if the identified destination port is not the congested network switch port.

7. The method of claim 3, wherein the determining step further comprises accessing the stored identified traffic contributions for the congested network switch port.

8. The method of claim 3, wherein the determining step further comprises periodically updating the identified traffic contributions for the respective source ports for said each destination port based on detected network traffic.

9. The method of claim 1, further comprising:
   receiving a first data packet from a transmitting one of the network nodes; and
   outputting to the transmitting network node a second rate control frame based on address information in the first data packet, the second rate control frame causing the transmitting network node to operate according to another at a data rate higher than the assigned bandwidth value.

10. The method of claim 9, wherein the second rate control frame outputting step comprises:
    identifying one of the network switch ports as a destination port for the first data packet based on the corresponding address information; and
    outputting to the transmitting network node the second rate control frame specifying a default bandwidth value, greater than the assigned bandwidth value, if the identified destination port is not the congested network switch port, the second rate control frame causing the transmitting network node to operate according to the default bandwidth value.

11. The method of claim 10, further comprising:
    receiving a second data packet from the transmitting network node;

identifying the congested network switch port as the destination port for the second data packet based on the corresponding address information; and outputting to the transmitting network node a third rate control frame specifying the assigned bandwidth value.

12. The method of claim 10, wherein the second rate control frame includes a flag causing the transmitting network node to disable rate control operations according to the assigned bandwidth value.

13. The method of claim 1, wherein the outputting step comprises:

outputting first rate control frames specifying the respective assigned bandwidth values to the respective network nodes;

receiving a data packet, having address information, from a transmitting one of the network nodes; and selectively sending to the transmitting network node a second rate control frame specifying rate control operations according to one of the corresponding assigned bandwidth value and a maximum bandwidth value based on the address information in the received data packet.

14. The method of claim 13, wherein the selectively sending step comprises:

identifying the congested network switch port as the destination port for the data packet based on the corresponding address information; and outputting to the transmitting network node the second rate control frame specifying rate control operations according to the assigned bandwidth value based on the congested network switch port identified as the destination port.

15. The method of claim 13, wherein the selectively sending step comprises:

identifying a second one of the network switch ports other than the congested network switch port as the destination port for the data packet based on the corresponding address information; and outputting to the transmitting network node the second rate control frame specifying rate control operations according to the maximum bandwidth value based on the second network switch port identified as the destination port.

16. A network switch comprising:

network switch ports for sending and receiving data packets between respective network nodes, each network switch port comprising an input buffer for receiving a received data packet from a corresponding network node and an output buffer for transmitting a switched data packet to the corresponding network node;

a first monitor configured for detecting a congestion condition in the output buffer of one of the network switch ports;

a data traffic monitor configured for determining a traffic contribution, relative to a total network traffic received by the congested network switch port, for each of the remaining network switch ports; and a rate controller for assigning bandwidth values based on the determined traffic contributions and the detected congestion condition and generating rate control frames, each rate control frame causing the corresponding network node to operate according to the corresponding assigned bandwidth value.

17. The network switch of claim 16, wherein the data traffic monitor includes a memory configured for storing, for each output buffer, the traffic contributions from the respective input buffers relative to the corresponding received network traffic.

18. The network switch of claim 17, wherein the data traffic monitor determines an input data rate to the congested network switch port for each of the remaining network switch ports, and stores in the memory, as the traffic contribution, the input data rate normalized relative to a total of the input data rates to the congested network switch port.

19. The network switch of claim 18, wherein the rate controller assigns each bandwidth value based on the normalized input data rate and an output data rate of the congested network switch port.

20. The network switch of claim 16, further comprising switching logic configured for determining a destination port for a data packet received from a transmitting one of the network nodes, the rate controller selectively outputting a second rate control frame specifying rate control operations according to one of the corresponding assigned bandwidth value and a maximum bandwidth value based on the destination port for the received data packet.

21. The method of claim 20, wherein the rate controller outputs the second rate control frame specifying rate control operations according to the assigned bandwidth value based on the congested network switch port identified by the switching logic as the destination port.

22. The method of claim 20, wherein the rate controller outputs the second rate control frame specifying rate control operations according to the maximum bandwidth value based on the second network switch port identified by the switching logic as the destination port.

* * * * *